United States Patent
Gandhi et al.

(10) Patent No.: US 8,798,050 B1
(45) Date of Patent: Aug. 5, 2014

(54) RE-OPTIMIZATION OF LOOSELY ROUTED P2MP-TE SUB-TREES

(75) Inventors: Rakesh Gandhi, Stittsville (CA); Tarek Saad, Nepean (CA); Zafar Ali, Hicksville, NY (US)

(73) Assignee: Cisco Technology, Inc., San Jose, CA (US)

( * ) Notice: Subject to any disclaimer, the term of this patent is extended or adjusted under 35 U.S.C. 154(b) by 172 days.

(21) Appl. No.: 13/562,013

(22) Filed: Jul. 30, 2012

(51) Int. Cl.
*H04L 12/701* (2013.01)
*H04L 12/801* (2013.01)
*H04L 29/00* (2006.01)
*H04L 12/56* (2006.01)
*H04L 29/06* (2006.01)

(52) U.S. Cl.
CPC ............... *H04L 45/00* (2013.01); *H04L 47/10* (2013.01); *H04L 49/351* (2013.01); *H04L 29/0653* (2013.01)
USPC .......................................................... 370/389

(58) Field of Classification Search
CPC ....... H04L 45/00; H04L 47/10; H04L 49/351; H04L 29/0653; H04L 29/06
See application file for complete search history.

(56) References Cited

U.S. PATENT DOCUMENTS

| | | | |
|---|---|---|---|
| 6,529,498 B1 | 3/2003 | Cheng | |
| 7,701,940 B2 | 4/2010 | Novello et al. | |
| 7,792,111 B2 | 9/2010 | Narayanan et al. | |
| 7,801,137 B2 | 9/2010 | Vasseur et al. | |
| 7,899,049 B2 | 3/2011 | Raj et al. | |
| 7,940,777 B2 | 5/2011 | Asati et al. | |
| 8,089,964 B2 | 1/2012 | Lo et al. | |
| 8,107,473 B2 | 1/2012 | Wijnands et al. | |
| 8,233,479 B2 | 7/2012 | Wijnands et al. | |
| 8,339,996 B2 | 12/2012 | Wijnands et al. | |
| 8,355,347 B2 | 1/2013 | Boers et al. | |
| 2006/0221867 A1 | 10/2006 | Wijnands et al. | |
| 2009/0271467 A1 | 10/2009 | Boers et al. | |

FOREIGN PATENT DOCUMENTS

EP 1653675 A1 * 5/2006
WO WO 2006045356 A1 * 5/2006

OTHER PUBLICATIONS

Network Working Group Request for Comments: 3468 Category: Informational Cisco Systems Feb. 2003 tiitled "The Multiprotocol Label Switching (MPLS) Working Group decision on MPLS signaling protocols".*

(Continued)

*Primary Examiner* — Andrew Lai
*Assistant Examiner* — Hoyet H Andrews
(74) *Attorney, Agent, or Firm* — Edwards Wildman Palmer LLP; James M. Behmke; Stephen D. LeBarron (57) ABSTRACT

In one embodiment, for a point to multipoint label switched path, an intermediate node receives a re-evaluation request from a head-end node for at least one routing path having a destination in a loosely routed network for a single destination or for a plurality of destinations in the label switched path forming tree or sub-tree. In response to the re-evaluation request, the intermediate node determines an availability for a remerge-free preferred path for the destination(s), which includes at least one loosely routed next hop, and the intermediate node transmits a preferred path available message to the head-end node based on the determined availability of the remerge-free preferred path.

21 Claims, 8 Drawing Sheets

(56) References Cited

OTHER PUBLICATIONS

Network Working Group Request for Comments: 4736 Cisco Systems, Inc.Category: Informational NTT Communications Corporation titled Reoptimization of Multiprotocol Label Switching (MPLS) Traffic Engineering (TE) Loosely Routed Label Switched Path (LSP) Nov. 2006.*

Aggarwal, et al., "Extensions to Resource Reservation Protocol—Traffic Engineering (RSVP-TE) for Point-to-Multipoint TE Label Switched Paths (LSPs)", The IETF Trust, Network Working Group, Request for Comments 4875, May 2007, 53 pages.

Ali, et al., "Signaling RSVP_TE P2MP LSPs in an Inter-Domain Environment", The IETF Trust, MPLS Working Group, Internet Draft, draft-ali-mpls-inter-domain-p2mp-rsvp-le-lsp-06.txt, Jul. 2011, 11 pages.

Vasseur, et al., "Reoptimization of MPLS Traffic Engineering Loosely Routed LSP", The IETF Trust, CCAMP Working Group, Internet Draft, draft-vasseur-ccamp-loose-path-repot-02.txt, Jul. 2004, 12 pages.

Vasseur, et al., "Reoptimization of Multiprotocol Label Switching (MPLS) Traffic Engineering (TE) Loosely Routed Label Switched Path (LSP)", The IETF Trust, Network Working Group, Request for Comments 4736, Nov. 2006, 14 pages.

* cited by examiner

RE-OPTIMIZATION OF LOOSELY ROUTED P2MP-TE SUB-TREES

TECHNICAL FIELD

The present disclosure relates generally to computer networks, and, more particularly, to optimizing loosely routed networks.

BACKGROUND

Point-to-MultiPoint (P2MP) Multi-Protocol Label Switching (MPLS) and generalized MPLS (GMPLS) Traffic Engineering label switched paths (TE LSPs) can be established in loosely routed networks. Loosely routed networks typically include loosely routed label switch paths, which do not provide explicit route identification for each node of the path. Instead, only part of the path (e.g., a next hop or hops) is set in advance. For loosely routed label switched paths, an intermediate node receives loose next hop information for one or more destinations for corresponding routing domains. The intermediate node can also determine a partial path or a whole path for the one or more destinations via expanding the loose next hops for each destination as the path is signaled or grafted. However, these partial paths or whole paths for the one or more destinations are not necessarily optimized and remerge-free.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, an intermediate node receives a re-evaluation request for a tunnel having at least one loose hop to at least one destination in a loosely routed network, the re-evaluation request being transmitted from a head-end node. The intermediate node determines, in response to the re-evaluation request, an availability for a remerge-free preferred path to the destination, the remerge-free preferred path including at least one loose next hop. The intermediate node transmits a preferred path available message to the head-end node based on the determined availability of the remerge-free preferred path.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs) supporting various networking techniques. For example, point-to-multipoint (P2MP) multiprotocol label switching (MPLS) and generalized MPLS (GMPLS) traffic engineering label switched paths (TE LSPs) are supported in these networks via routing and signaling techniques as described in Internet Engineering Task Force (IETF) Request for Comment (RFC) document, entitled "Extensions to Resource Reservation Protocol—Traffic Engineering (RSVP-TE) for Point-to-Multipoint TE Label Switched Paths (LSPs) (RFC 4875) by Aggarwal, et al. (May 2007 version).

Figure 1:
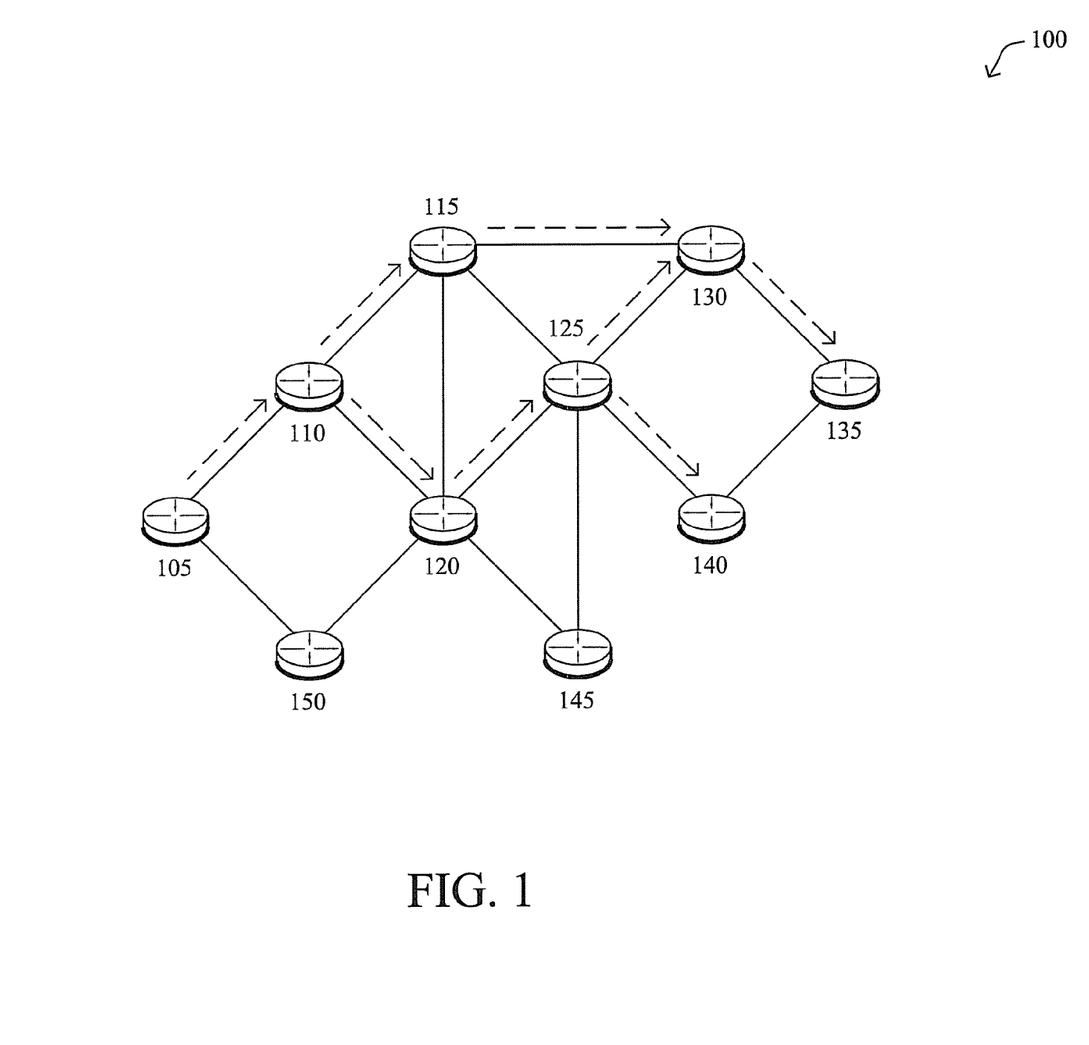
FIG. 1 illustrates an example loosely routed communication network.

FIG. 1 is a schematic block diagram of an example loosely routed network 100 illustratively comprising nodes/devices such as routers, switches, computers, etc., interconnected by various methods of communication. For instance, the links between nodes (e.g., labeled as 105-150, and described in FIG. 2 below) may be wired, shared media, or wireless, and certain nodes, may be in communication with other nodes, e.g., intermediate nodes, based on routing techniques, signal strength, current operational status, location, etc. In particular, network 100 illustrates a signal path from a node 105 (e.g., head-end node) to two destination nodes (e.g., node 140 and node 135). For example, one loosely routed label switched path from head-end node 105 to destination node 135 can include node 110 (e.g., an intermediate node), a loosely routed path (e.g., multiple paths to other network nodes such as nodes 115, 120, and 125), and network node 130. In this fashion, data transmitted from node 105 can be loosely routed to node 135. Those skilled in the art will understand that any number of nodes, devices, links, etc. may be used in the loosely routed network, and that the view shown herein is for simplicity. Also, those skilled in the art will further understand that while the network is shown in a certain orientation, particularly with a head-end node 105 and destination nodes 135 and 140, the loosely routed network 100 is merely an example illustration that is not meant to limit the disclosure. Further, although the various nodes/devices are shown as part of a single network (e.g., loosely routed network 100), any of the nodes/devices can represent nodes of various other networks.

Figure 2:
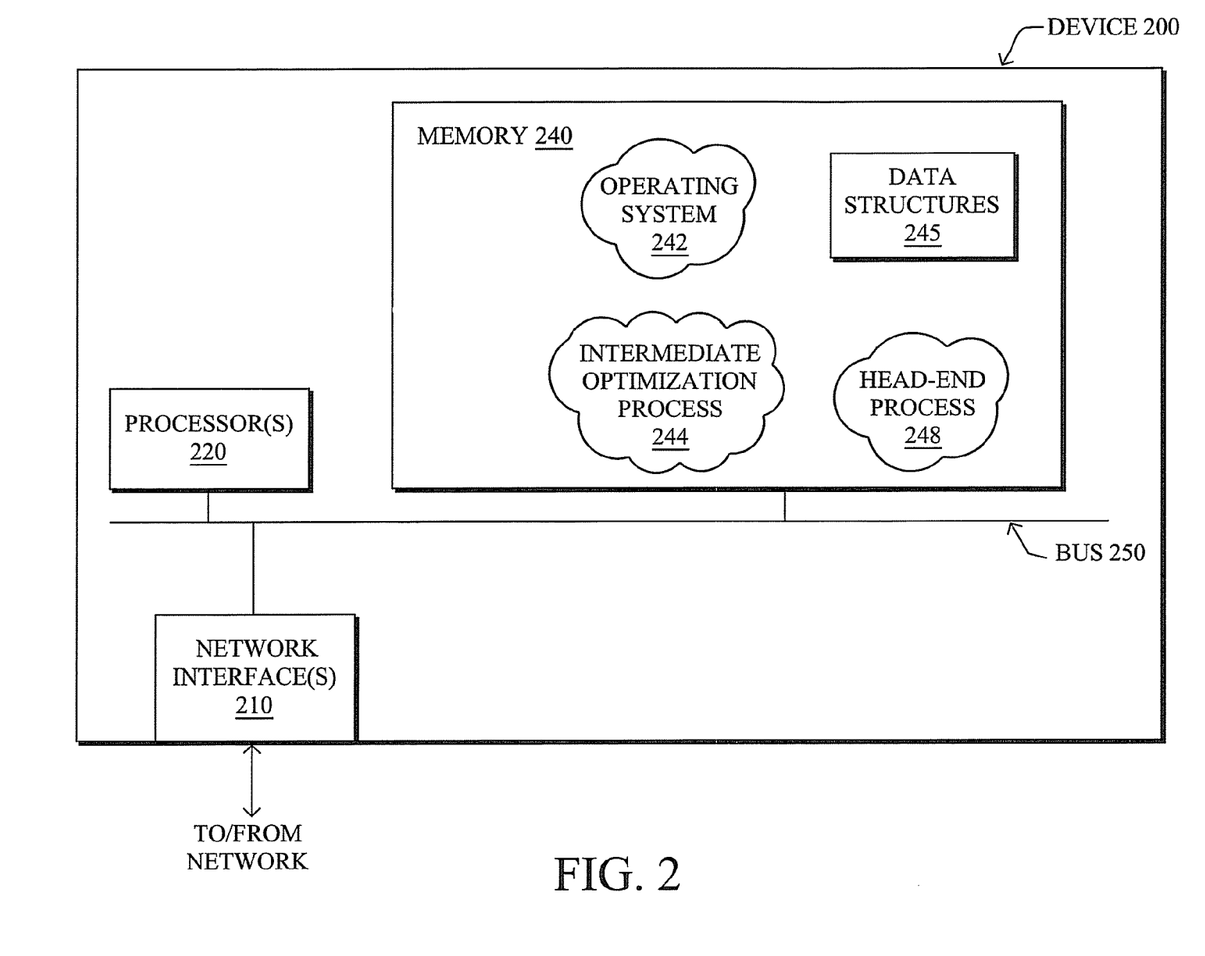
FIG. 2 illustrates an example network device/node.

FIG. 2 is a schematic block diagram of an example node/device 200 that may be used with one or more embodiments described herein, e.g., as any of the head-end nodes, intermediate nodes, or destination nodes shown in FIG. 1 above. The device may comprise one or more network interfaces 210 (e.g., wired, wireless, etc.), at least one processor 220, and a memory 240 interconnected by a system bus 250.

The network interface(s) 210 comprise the mechanical, electrical, and signaling circuitry for communicating data over network 100. Network interfaces 210 may be configured to transmit and/or receive data using a variety of different communication protocols (e.g., P2MP MPLS, GMPLS, etc.). Note that each device may include one or more different types of network connections 210, e.g., wireless and wired/physical connections, and that the view herein is merely for illustration.

Memory 240 comprises a plurality of storage locations that are addressable by the processor 220 and the network interfaces 210 for storing software programs and data structures associated with the embodiments described herein. Processor 220 may comprise hardware elements or hardware logic adapted to execute the software programs and manipulate the data structures 245. Operating systems 242, portions of which are typically resident in memory 240 and executed by the processor, functionally organizes the device by, inter alia, invoking operations in support of software processes and/or services executing on the device. These software processes and/or services may comprise intermediate optimization process/services 244, and a request optimization process 248, as described herein, particularly whether the device is acting as an intermediate node or head-end node, respectively. Note that while processes 244 and 248 are shown in centralized memory 240, additional embodiments provide for one or more of the processes to be specifically operated within the network interfaces 210.

Intermediate optimization process 244 and request optimization 248 may comprise computer executable instructions executed by the processor 220 to perform functions provided by one or more routing protocols, such as Interior Gateway Protocol (IGP) (e.g., Open Shortest Path First, (OSPF), and Intermediate-System-to-Intermediate-System, (IS-IS)), Border Gateway Protocol (BGP), Internet Protocol (IP), Autonomous Systems Protocols (ASes), etc.), as will be understood by those skilled in the art. In addition, access process 244 and aggregation process 248 can support Multiprotocol Label Switching (MPLS), Generalized MPLS (GMPLS) Traffic Engineering Label Switched Paths (TE LSPs)), etc. These functions may, on capable devices, be configured to request and manage a routing/forwarding paths, routing/forwarding trees and sub-trees (e.g., a data structure 245) containing, e.g., data used to make routing/forwarding decisions.

Each of the techniques described herein may be performed by hardware, software, and/or firmware, such as in accordance with processes 244, 248, or a combination thereof, which may contain computer executable instructions executed by the processor 220 (or independent processor of interfaces 210). In addition, while processes 244 and 248 are shown as installed in a memory 240, and therefore being implemented in software, these processes could be implemented in any of hardware (e.g., electronic circuitry), firmware, software, or a combination thereof. Alternatively, these processes may be configured on a storage medium for subsequent loading into memory 240. The storage medium can include a computer-readable medium encoded with a computer program, and can be any conventional storage medium that stores the processes thereon in tangible form. Examples of storage media include a floppy disk, a compact disk, a magnetic tape, a read only memory, an optical storage media, universal serial bus (USB) flash drive, etc. Alternatively, storage media can include a random access memory, or other type of electronic storage, located on a remote storage system and coupled to processor 220, via network interface 210.

As will be apparent to those skilled in the art other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

As noted above, intermediate nodes in loosely routed networks (e.g., P2MP-TE LSPs) often build sub-optimal pathways (e.g., trees, sub-trees, etc) when label switched paths (LSPs) are setup since path determinations typically depend on an order which destinations are being added. The techniques provided herein provide for optimizing these sub-optimal trees via signaling (e.g., requests, queries, notifications, etc.) between head-end nodes and intermediate nodes.

With respect to "remerges", the term "remerge" refers to situations when a path branches at some point or node and intersects at another subsequent node further down the pathway toward a destination. For example, referring again to FIG. 1, a remerge exists between node 110 and node 130. Data intersects at node 130 since there are two pathways for data to flow from node 110 (e.g., data can traverse node 115 to node 130 or data can traverse node 120 and node 125 to node 130). Remerges may occur due to discrepancies in routing algorithms used by various intermediate nodes, errors in path calculation or manual configuration, or network topology changes. Remerges are inefficient due to unnecessary duplication of data and using additional link bandwidth resources in the network. Remerge paths can prove problematic when, for example, the network spans multiple domains. For the purposes of this disclosure, a domain is considered to be any collection of network elements within a common sphere of address management or path computational responsibility. Examples of such domains include Interior Gateway Protocol (IGP) areas and Autonomous Systems (ASes). In an inter-domain environment, an ingress node may not have topological visibility into other domains to be able to compute and signal a remerge-free network. Accordingly, a border node of a traversed domain may only have loose next hops information for one or more destinations in a network.

Notably, the border node of the traversed domain typically computes local domain paths by individually expanding the loose next hops for the destinations belonging to the same network as they are signaled or grafted. Some attempts to determine lower cost point to multipoint label switch path (P2MP LSP) remerge-free paths is for the border node to treat paths for newly grafted destinations that branch off existing P2MP LSP paths as independent shortest path to loose next hops. However, such attempts are subject to an order of computation of destination sub-paths and may not result in the optimal or minimal cost tree set. For example, the border node may not have knowledge of all of the destinations of the network when processing a path message (e.g., not all layer 2 traffic for a particular pathway necessarily pass through a particular border node). Accordingly, the border node may not be able to expand loose hop(s) in such a way that the overall network path is guaranteed to be remerge-free.

The techniques described herein provide signaling mechanisms (e.g., RSVP-TE) for loosely routed network (e.g., P2MP MPLS LSP) that optimize signal paths in a loosely routed domain and eliminate remerge paths using for example, control plane and a data plane approaches. Illustratively, the techniques described herein may be performed by hardware, software, and/or firmware, such as in accordance with the "intermediate optimization" process 244 or "head-end" process 248, which may contain computer executable instructions executed by the processor 220 (or independent processor of interfaces 210) to perform functions relating to the techniques described herein. Notably, these techniques herein may be treated as extensions to conventional protocols, such as the various telecommunication protocols (e.g., as described in RFC 4875 mentioned above), and as such, may be processed by similar components understood in the art that execute those protocols, accordingly.

Operationally, under the control of access process 244, a device can act as an intermediate device/node (e.g., a border network node). According to intermediate optimization process 244, the intermediate device can receive a re-evaluation request from a head-end node for at least one routing path having a destination in a loosely routed network. In response to the re-evaluation request, the intermediate node can determine an availability for a remerge-free preferred path for the destination, which includes at least one loosely routed next hop. Once determined, the intermediate node may further transmit a preferred path available message to the head-end node based on the determined availability of the remerge-free preferred path.

In other embodiments, under the control of request optimization "head-end" process 248, a device can act as a request optimization device/node. According to head-end optimization process 248, a requesting device (e.g., a head-end device) can generate a re-evaluation request for a tunnel having at least one loose hop to a destination in a loosely routed network, and transmit the re-evaluation request an intermediate node thereby causing the intermediate node to determine an availability for a remerge-free preferred path for the destination. Notably, the remerge-free preferred path can include at least one loosely next hop. The re-evaluation request, when received by the intermediate node, further causes the intermediate node to transmit a preferred path available message to the requesting node based on the determined availability of the remerge-free preferred path. The requesting node can receive the preferred path available message and transmit data to the intermediate node based upon the preferred path available message.

For example, FIGS. 3-6 illustrate a progression of the above-described techniques (e.g., intermediate optimization process 244 and request optimization process 248) and illustrate optimizing remerge-free pathways (e.g., trees and sub-trees) for one or more destinations in a loosely routed network. In particular, according to the progression in FIGS. 3-6, a requesting node (e.g., a head-end node) transmits a request for an optimized remerge-free path to one or more destinations to an intermediate node. The intermediate node receives the request, determines an optimized remerge-free path for each destination and transmits a response message back to the head-end node. The requesting node subsequently transmits data to each destination based on respective optimized remerge-free paths.

Figure 3:
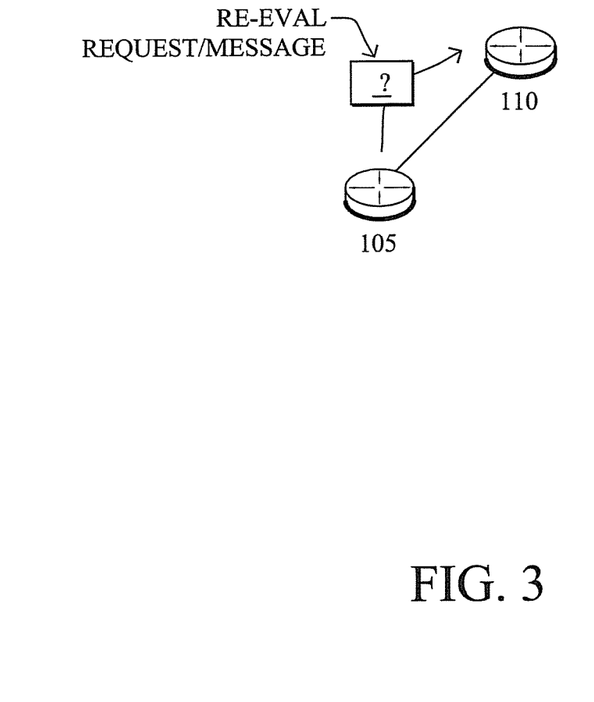
FIG. 3 illustrates an example view of a head-end node transmitting a re-evaluation request to an intermediate node for at least one routing path.

In particular, FIG. 3 illustrates an example view of a requesting node (e.g., head-end node) transmitting a re-evaluation request or message to an intermediate node. As illustrated, head-end node 105 transmits the re-evaluation request or message to intermediate node 110. This re-evaluation request can be for routing paths to one or more destinations (e.g., destination node 135 and/or destination node 140). For example, head-end node 105 can transmit a signaling message such as "P2MP-TE destination re-evaluation request" query. In one or more additional embodiments, the head-end node can request optimizing an entire label switched path (tree) or sub-tree path by signaling a request for all destinations (e.g., a "P2MP-TE tree paths re-evaluation request" query or a "P2MP-TE sub-tree paths re-evaluation request"), and/or the head-end node can re-optimize selected destination(s) in the network (e.g., a subset of pathways or sub-trees). In this case, head-end node 105 can transmit a signaling message such as "P2MP-TE tree re-evaluation request" or "P2MP-TE sub-tree re-evaluation request" query. Notably, this signaling can be achieved via control plane mechanisms (e.g., RSVP signaling) and/or data plane mechanisms (e.g., adding a new flag for attributes in RSVP).

Figure 4:
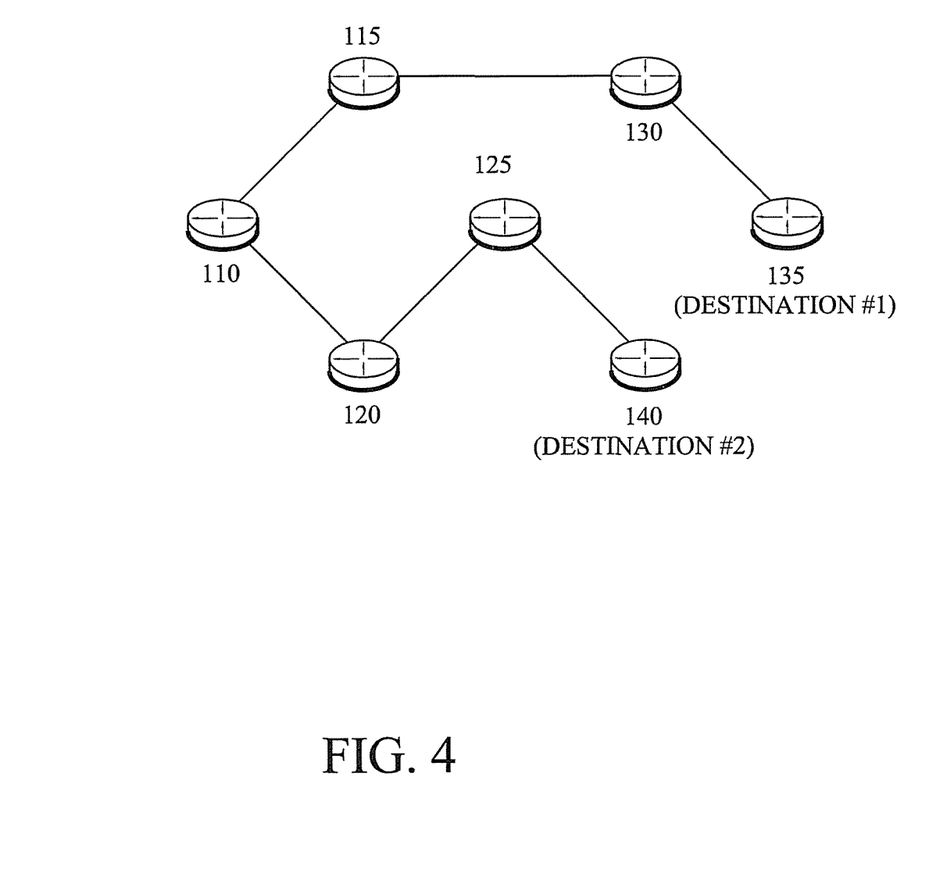
FIG. 4 illustrates remerge-free preferred paths for destinations relative to the intermediate node.

FIG. 4 illustrates remerge-free preferred paths (e.g., P2MP paths) for destinations in the loosely routed network determined by the intermediate node. In particular, FIG. 4 shows intermediate node 110 determining optimized remerge-free paths to destination node 140 and destination node 135. Intermediate node 110 can determine optimized remerge paths for destinations via Explicit Route Object (ERO) expansion for loose next hops along the path toward the destination. In addition, the intermediate node can include and may prioritize or favor recently added next hop pathways when determining the remerge-free paths. In this fashion, the intermediate node computes a new path for loosely routed destinations. Further, these optimized remerge-free paths can be cached for a period of time (e.g., 30 seconds) by the intermediate node (or various other nodes in the network) for subsequent use and to avoid processing overload under scale when a subsequent request is for a shared destination. For example, intermediate node 110 can receive a second re-evaluation request for a tunnel sharing the destination node 135. The intermediate node can determine an availability for a remerge-free preferred path in response to this request based on the cached remerge-free preferred path and transmit a path available message to the requesting node. Moreover, the availability for the remerge-free preferred path can be based on criteria such as a total path metric, a total number of hops, a shortest path, most link bandwidth resource sharing, etc. Notably, each destination having a remerge-free preferred path are typically signaled independently. That is, as illustrated, intermediate node 110 receives two requests (e.g., a control plane messages) from head-end node (not shown) for a remerge-free preferred path-one request for destination node 135 and one request for destination node 140.

Figure 5:
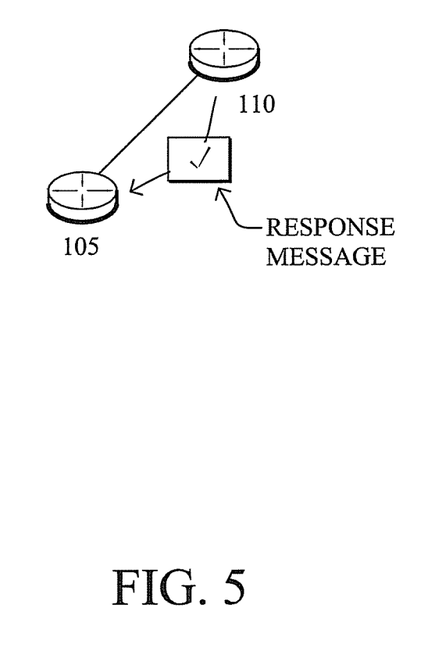
FIG. 5 illustrates the intermediate node transmitting a preferred path available message to the head-end node based on the determined availability of the remerge-free preferred path.

FIG. 5 illustrates the intermediate node transmitting a preferred path available message (e.g., "Preferred P2MP-TE tree exists" or "Preferred P2MP-TE sub-tree exists" or "Preferred P2MP-TE destination path exists") to the head-end node based on the determined availability of the remerge-free preferred path. If no preferred path is determined, the intermediate node can propagate the re-evaluation request downstream (e.g., to subsequent nodes). In some embodiments, if no preferred path is determined or re-optimization for a single destination is not supported, the intermediate node generates a preferred path not available message or terminates the re-evaluation request message propagation to avoid the head-end node from setting up per destination re-optimization. When a head-end queries for "P2MP-TE destination re-evaluation request", an intermediate node may reply with "Preferred P2MP-TE tree exists" or "Preferred P2MP-TE sub-tree exists" instead of "Preferred P2MP-TE destination path exists" and vice versa. Alternatively, when the head-end node receives the preferred path not available message, the head-end node can cancel or terminate the re-optimization for part of all of the destinations. After head-end receives the Preferred P2MP-TE destination or tree path exists message, head-end node initiates re-optimization of the P2MP LSP (entire tree or sub-tree) to be setup on the more optimal paths. Head-end node can start sending data on the new LSP after P2MP LSP is fully setup on the new path and re-optimization process is completed.

Figure 6:
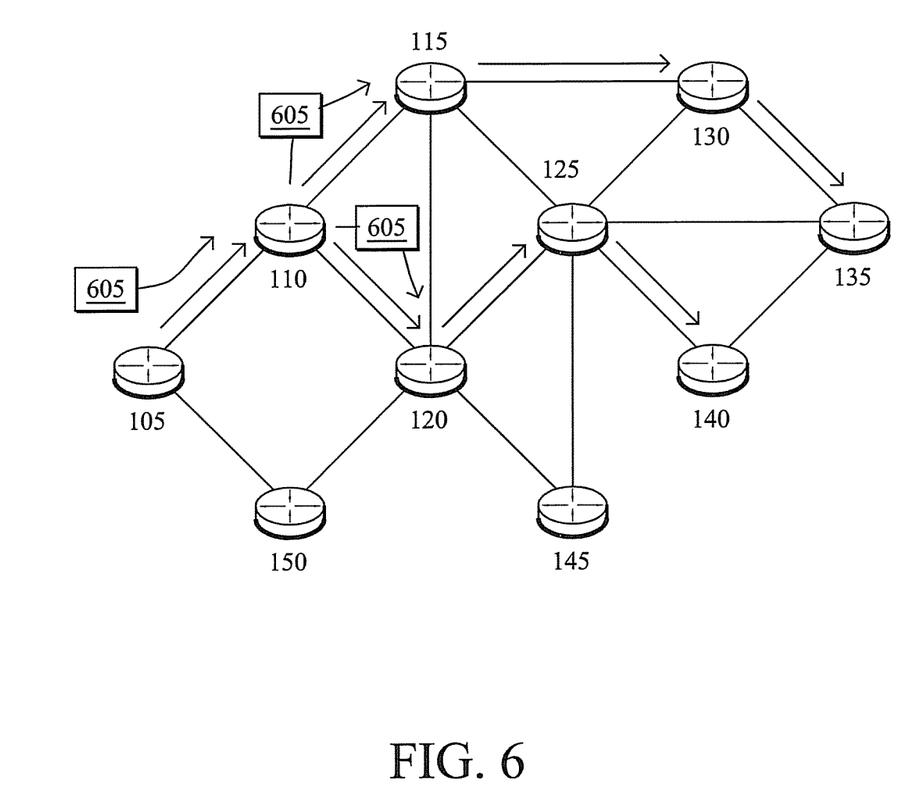
FIG. 6 illustrates the head-end node transmitting data to one or more destinations based on the determined remerge-free preferred path.

FIG. 6 illustrates the head-end node transmitting data to one or more destinations based on the determined one or more remerge-free preferred paths. As shown, head-end node 105 transmits data (e.g., "message 605" or data 605) to intermediate node 110. Intermediate node 110 receives data 605 and replicates data 605 for destination nodes 135 and 140. Intermediate node further transmits the data according to respective optimized preferred remerge-free pathways.

Thus, FIGS. 3-6 illustrate a progression of head-end node and intermediate node signaling to optimize pathways in a loosely routed network. These techniques allow intermediate nodes to build optimal whole trees or sub-trees for loosely routed destinations. Moreover, the techniques can be scalable and are applicable for various networks and inter-network domains.

Figure 7:
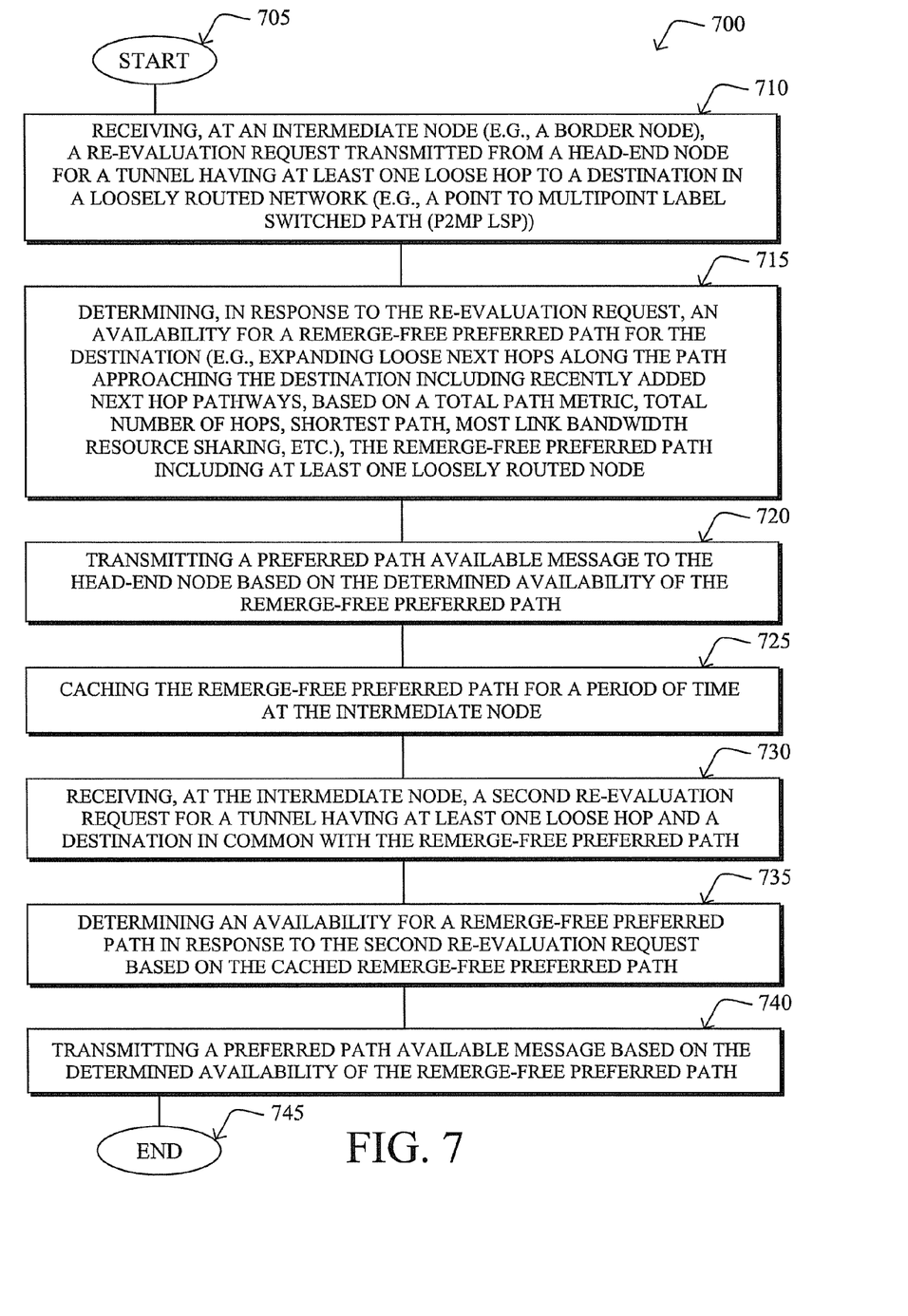
FIG. 7 illustrates an example simplified procedure for determining an availability for a remerge-free preferred path relative to the intermediate node.

FIG. 7 illustrates an example simplified intermediate optimization procedure 700 in accordance with one or more embodiments described herein, particularly from the perspective of an intermediate device/node. The procedure 700 starts at step 705, and continues to step 710, where, as described in greater detail above, the intermediate node (e.g., node 110) receives a re-evaluation request (e.g., for a routing path toward a destination, a point to multipoint (P2MP) tree path, a P2MP sub-tree, etc.) transmitted from a head-end node (e.g., node 105) for at least one routing path having a destination in a loosely routed network (e.g., a point to multipoint label switched path (P2MP LSP) network). As discussed above, the re-evaluation request can be a request for a re-evaluation of a point-to-multipoint (P2MP) tree path toward the destination or a re-evaluation of a P2MP sub-tree path toward the destination. In step 715, the intermediate node determines, in response to the re-evaluation request, an availability for a remerge-free preferred path for the destination(s). As discussed above, the intermediate node can determine the remerge-free preferred path via expanding loose next hops along the path toward a destination, including recently added next hop pathways during the expansion, accounting for a total path metric, a number of hops, shortest paths, most link bandwidth resource sharing, etc. Notably, the remerge-free preferred path includes at least one loosely next hop. Further, as discussed above the intermediate node can expand loose next hops according to the type of re-evaluation request (e.g., expanding loose next hops according to the routing path of a destination, a P2MP tree, a P2MP sub-tree, etc.). In step 720, the intermediate node transmits a preferred path available message (or a preferred path not available message) to the head-end node based on the determined availability of the remerge-free preferred path. Further, the intermediate node can indicate in the preferred path available message that a preferred path is available for a destination, a P2MP tree, a P2MP sub-tree, etc. Notably, if no remerge-free preferred path or sub-path is available, a node may forward the re-evaluation request to downstream nodes. As discussed above, in step 725 the intermediate node can cache the remerge-free preferred path for a period of time. In step, 730 the intermediate node receives a second re-evaluation request for a tunnel having at least one loose hop to a destination in common with the remerge-free preferred path. In response to the second re-evaluation request, the intermediate node, in step 735, determines and availability for a remerge-free preferred path based on the cached remerge-free preferred path. As discussed above, in step 740, the intermediate node can further transmit a preferred path available message based on the determined availability of the remerge-free preferred path. The procedure 700 may subsequently end in step 745, or, may return to step 705 to receive a re-evaluation request.

Figure 8:
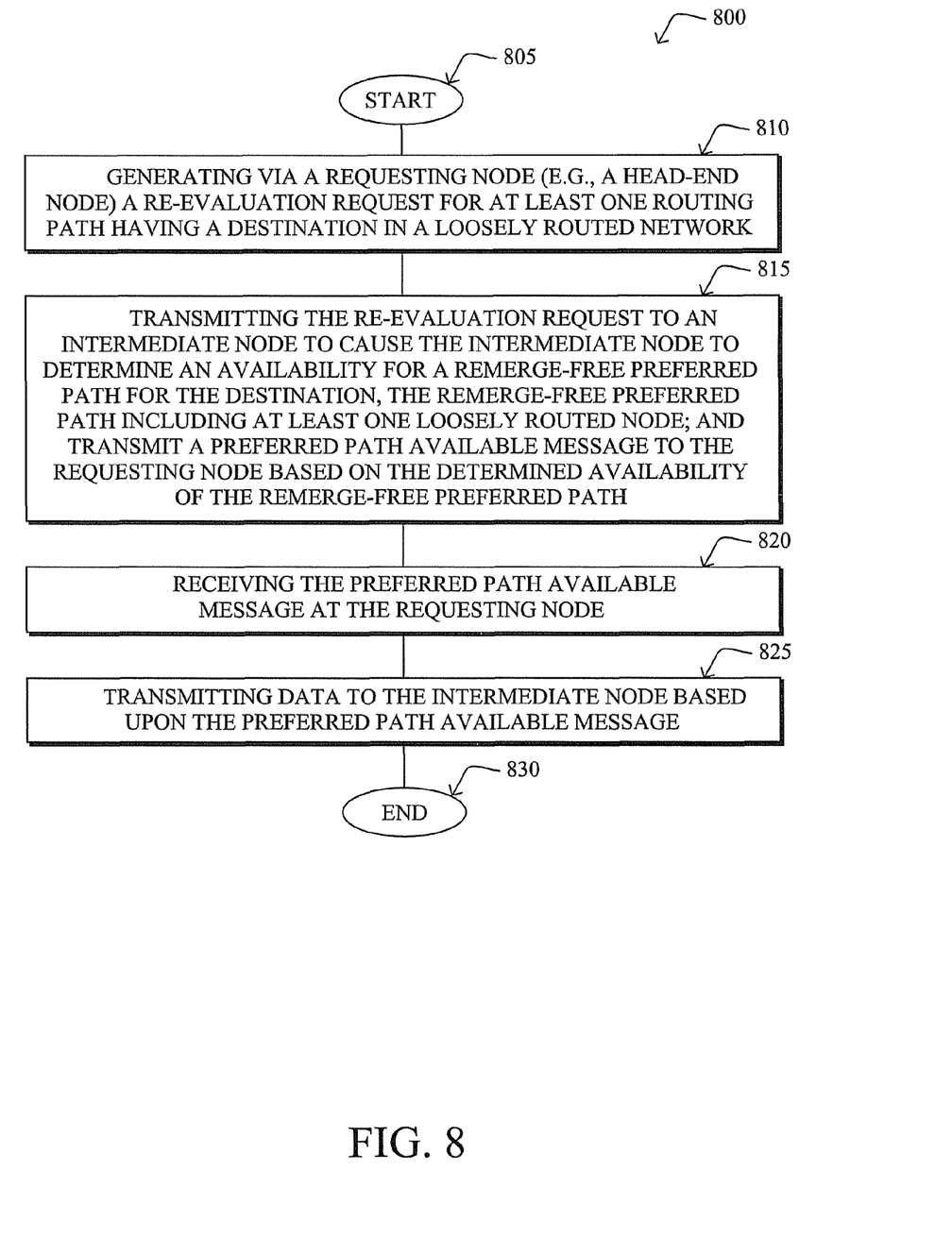
FIG. 8 illustrates an example simplified procedure for determining the availability for the remerge-free preferred path relative to the head-end node.

Moreover, FIG. 8 illustrates an example simplified access procedure 800 for determining the availability for the remerge-free preferred path in accordance with one or more embodiments described herein, particularly from the perspective of a head-end device/node. The procedure 800 starts at step 805, and continues to step 810, where, as described in greater detail above, the head-end node can generate and/or transmit a re-evaluation request for one or more routing path having a destination in a loosely routed network (e.g., a P2MP MPLS LSP network). In step 815, the head-end node transmits the re-evaluation request to an intermediate node (e.g., node 110) and causes the intermediate node to determine an availability for a remerge-free preferred path for the destination(s). Notably, the remerge-free preferred path can include at least one loosely routed next hop. In addition, the re-evaluation request, when received by the intermediate node, further causes the intermediate node to transmit a preferred path available message to the head-end node based on the determined availability of the remerge-free preferred path. In step 820, the head-end node receives the preferred path available message from the intermediate node and in step 825, the head-end node transmits data to the intermediate node based upon the preferred path available message (e.g., depending if a preferred path is available). The procedure 800 may subsequently end in step 830, or, may return to step 805 to generate a re-evaluation request.

It should be noted that while certain steps within procedures 700-800 may be optional as described above, the steps shown in FIGS. 7-8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 700-800 are described separately, certain steps from each procedure may be incorporated into each other procedure, and the procedures are not meant to be mutually exclusive.

The techniques described herein, therefore, provide for optimizing signal paths and sub paths in loosely routed networks (e.g., P2MP MPLS LSP networks). In particular, the techniques herein advantageously allow intermediate nodes to re-optimize signal paths and overcome restrictions of signal paths established according to when a destination is added (e.g., order of destination). The intermediate node optimizes signal paths and eliminates remerges and results in a lower cost and improves efficiency of network resources. The techniques further allow re-optimization of a subset of the path e.g. a sub-path that belongs to a specific routing domain, which improves scale and provides isolation between routing domains and can be applied to any telecommunication network. Moreover, as discussed above, the intermediate node can cache re-optimized paths for destinations, thus reducing processing loads.

While there have been shown and described illustrative embodiments that provide re-optimization of loosely routed paths within a loosely routed network, it is to be understood that various other adaptations and modifications may be made within the spirit and scope of the embodiments herein. For example, the embodiments have been shown and described herein with relation to destinations within a single P2MP LSP network. However, the embodiments in their broader sense are not as limited, and may, in fact, be used in conjunction with multiple other networks. In addition, while certain protocols are shown, such as MPLS LSP, other suitable protocols may be used, accordingly. Also, while the techniques generally describe initiation and requests for re-evaluation by a head-end node (e.g., node 110), intermediate nodes (e.g., node 130) can trigger per destination(s) or per path (e.g., per P2MP tree, per P2MP sub-tree, a plurality of destinations belonging to a same label switched path) re-optimization requests for re-evaluation from the head-end node resulting in faster convergence. Also, other nodes not along the paths (e.g., computation nodes, network management nodes, etc.) may also be configured to request re-evaluation of the paths.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, at an intermediate node, a re-evaluation request for a tunnel having at least one loose hop to at least one destination in a loosely routed network, the re-evaluation request being transmitted from a head-end node;
   determining, in response to the re-evaluation request, an availability for a remerge-free preferred path to the destination, the remerge-free preferred path including at least one loose next hop; and
   transmitting a preferred path available message to the head-end node based on the determined availability of the remerge-free preferred path.

2. The method of claim 1, wherein the at least one destination includes a plurality of destinations that belong to a same label switched path, wherein each destination has a corresponding re-evaluation request, wherein determining the availability for the remerge-free preferred path further comprises determining the remerge-free preferred path for the plurality of destinations forming one of a point to multipoint (P2MP) tree or a P2MP sub-tree, wherein transmitting the preferred path available message further comprises transmitting the preferred path available message for the plurality of destinations.

3. The method of claim 1, further comprising:
   caching the remerge-free preferred path for a period of time at the intermediate node;
   receiving, at the intermediate node, a second re-evaluation request for a tunnel having at least one loose hop to a destination in common with the remerge-free preferred path;
   determining, at the intermediate node, an availability for a remerge-free preferred path in response to the second re-evaluation request based on the cached remerge-free preferred path; and
   transmitting a preferred path available message based on the determined availability of the remerge-free preferred path.

4. The method of claim 1, wherein determining the availability for the remerge-free preferred path is based on at least one of a total metric, or a total number of hops.

5. The method of claim 1, wherein the destination belongs to a point to multipoint (P2MP) path within a routing domain.

6. The method of claim 1, wherein determining the availability for a remerge-free preferred path for the destination further comprises:
   expanding loose next hops along the path toward the destination, including recently added next hop pathways during the expanding.

7. The method of claim 1, wherein the a re-evaluation request further comprises one of a re-evaluation request for a point to multipoint (P2MP) tree path toward the destination or re-evaluation request for a P2MP sub-tree path toward the destination; wherein determining the availability for a remerge-free preferred path for the destination further comprises expanding loose next hops along one of a corresponding P2MP tree or a corresponding P2MP sub-tree.

8. The method of claim 1, wherein the remerge-free preferred path for the destination comprises one of a shortest route or a path with most link bandwidth resource sharing.

9. A method, comprising:
   generating a re-evaluation request for a tunnel having at least one loose hop to a destination in a loosely routed network;
   transmitting the re-evaluation request to an intermediate node to cause the intermediate node to determine an availability for a remerge-free preferred path for the destination or plurality of destinations that belong to the same label switch path, the remerge-free preferred path including at least one loosely next hop; and transmit a preferred path available message to a requesting node based on the determined availability of the remerge-free preferred path;
   receiving the preferred path available message at the requesting node; and
   transmitting data to the intermediate node based upon the preferred path available message.

10. An apparatus, comprising:
    one or more network interfaces of an intermediate node that communicate with a loosely routed network;
    a processor coupled to the network interfaces and adapted to execute one or more processes; and
    a memory configured to store a process executable by the processor, the process when executed operable to:
       receive a re-evaluation request for a tunnel having at least one loose hop to a destination in the loosely routed network, the re-evaluation request being transmitted from a head-end node;
       determine, in response to the re-evaluation request, an availability for a remerge-free preferred path for the destination, the remerge-free preferred path including at least one loosely next hop; and
       transmit a preferred path available message to the head-end node based on the determined availability of the remerge-free preferred path.

11. The apparatus as in claim 10, wherein the process when executed to transmit the preferred path available message to the head-end node further causes the head-end node to transmit messages according to the preferred path.

12. The apparatus as in claim 10, wherein the process when executed is further operable to:
    cache the remerge-free preferred path for a period of time at the intermediate node;
    receive a second re-evaluation request for a tunnel having at least one loose hop to a destination in common with the remerge-free preferred path;
    determine an availability for a remerge-free preferred path in response to the second re-evaluation request based on the cached remerge-free preferred path; and
    transmit a preferred path available message based on the determined availability of the remerge-free preferred path.

13. The apparatus of claim 10, wherein the availability for the remerge-free preferred path is determined based at least in part on a total metric, or a total number of hops.

14. The apparatus of claim 10, wherein the process, when executed to determined availability for a remerge-free preferred path for the destination is further operable to:
   expand loose next hops along the path to the destination, including recently added next hop pathways.

15. The apparatus of claim 10, wherein the intermediate node is a border node.

16. The apparatus of claim 10, wherein the remerge-free preferred path for the destination comprises one of a shortest route or a path with most link bandwidth resource sharing.

17. A tangible, non-transitory, computer-readable media having software encoded thereon, the software when executed by a processor of an intermediate node operable to:
   receive a re-evaluation request for a tunnel having at least one loose hop to a destination in the loosely routed network, the re-evaluation request being transmitted from a head-end node;
   determine, in response to the re-evaluation request, an availability for a remerge-free preferred path for the destination, the remerge-free preferred path including at least one loosely routed next hop; and
   transmit a preferred path available message to the head-end node based on the determined availability of the remerge-free preferred path.

18. The computer-readable media as in claim 17, wherein when the software is executed to transmit the preferred path available message to the head-end node further causes the head-end node to transmit messages according to the preferred path.

19. The computer-readable media as in claim 17, wherein when the software is executed is further operable to:
   cache the remerge-free preferred path for a period of time;
   receive a second re-evaluation request for a tunnel having at least one loose hop to a destination in common with the remerge-free preferred path;
   determine an availability for a remerge-free preferred path in response to the second re-evaluation request based on the cached remerge-free preferred path; and
   transmit a preferred path available message based on the determined availability of the remerge-free preferred path.

20. The computer-readable media as in claim 17, wherein the availability for the remerge-free preferred path is determined based at least in part on a total metric, or a total number of hops.

21. The computer-readable media as in claim 17, wherein the remerge-free preferred path for the destination comprises a shortest route.

* * * * *